United States Patent [19]

Ito et al.

[11] 4,307,211

[45] Dec. 22, 1981

[54] PREPARATION OF AN ETHYLENE-ETHYL ACRYLATE-ACRYLIC ACID TERPOLYMER

[75] Inventors: Yukio Ito; Kazuyuki Isobe; Kiroku Tsukada, all of Yokohama; Fumio Tsuruwaka, Kamakura, all of Japan

[73] Assignee: Union Carbide Corporation, New York, N.Y.

[21] Appl. No.: 847,177

[22] Filed: Oct. 31, 1977

[51] Int. Cl.$^3$ ............................................... C08F 8/12
[52] U.S. Cl. ............................................ 525/383; 525/329
[58] Field of Search .................. 526/53; 525/383, 329

[56] References Cited

U.S. PATENT DOCUMENTS

| 2,953,551 | 9/1960 | White | 526/229 |
| 3,249,570 | 5/1966 | Potts et al. | 260/29.6 |
| 3,557,070 | 1/1971 | Anspon et al. | 526/53 |
| 3,674,761 | 7/1972 | Anspon et al. | 526/53 |
| 3,681,313 | 8/1972 | Anspon et al. | 526/53 |
| 3,970,626 | 7/1976 | Hurst et al. | 526/47.6 |

Primary Examiner—William F. Hamrock
Attorney, Agent, or Firm—Clement J. Vicari

[57] ABSTRACT

Preparation of an ethylene-ethyl acrylate-acrylic acid terpolymer by hydrolysis of ethylene-ethyl acrylate copolymer in an inert atmosphere at a temperature of from about 150° C. to about 450° C. and a pressure of from about 3 to about 300 kg/cm$^2$.

9 Claims, No Drawings

PREPARATION OF AN ETHYLENE-ETHYL ACRYLATE-ACRYLIC ACID TERPOLYMER

BACKGROUND OF THE INVENTION

1. Field of the Invention

This invention relates to a process of preparing ethylene-ethyl acrylate-acrylic acid terpolymer having a melt index of from about 50 to about 2000 decigrams per minute, from ethylene-ethyl acrylate copolymer having a melt index of from 0.1 to about 300 decigrams per minute by hydrolyzing the ethylene-ethyl acrylate copolymer in an inert atmosphere, at a temperature of from about 150° C. to about 450° C. and a pressure of from about 3 to about 300 kg/cm$^2$.

2. Description of the Prior Art

Ethylene-ethyl acrylate-acrylic acid terpolymers find use in a variety of applications such as in the extrusion coating or paper, emulsion adhesives and aqueous paints, generally in the form of an aqueous solution of ammonium salt, for example. Ethylene-ethyl acrylate-acrylic acid terpolymers have been prepared by the alkaline or acidic hydrolysis of ethylene alkyl acrylate copolymers as described in U.S. Pat. No. 3,249,570, for example. Acidic hydrolysis conditions utilize sulfuric, phosphoric or hydrochloric acid, while basic hydrolysis conditions utilize a base, such as sodium or potassium hydroxide. Also, ammonium type hydrolyzing agents can be used. These acidic or basic hydrolyzing agents corrode the autoclave excessively at temperatures suitable for chain scission. Additionally, the use of alkali metal hydroxides requires an additional step of freeing the product from the inorganic salts. Also, use of ammonium hydrolyzing agents results in amide formation.

SUMMARY OF THE INVENTION

It has now been found that ethylene-ethyl acrylate-acrylic acid terpolymers having a melt index from about 50 to about 2000 decigrams per minute can be produced by hydrolyzing ethylene-ethyl acrylate copolymers having a melt index of from about 0.1 to about 300 decigrams per minute in an inert atmosphere, at a temperature of from about 150° to about 450° C. and a pressure of from about 3 to about 300 kg/cm$^2$, without the use of acidic, basic or ammonium hydrolyzing agents.

The ethylene-ethyl acrylate-acrylic acid terpolymers produced by the process of the present invention have a melt index of about 50 to about 2000 decigrams per minute (as measured by ASTM D-1238 at 44 psi test pressure), ethyl acrylate content of from 0 to about 16 mole percent and an acrylic acid content of from 0 to about 16 mole percent.

The ethylene-ethyl acrylate-acrylic acid terpolymer, produced by the present method, becomes a less viscous ammonia water solution at high concentrations starting from a commercial grade of ethylene-ethyl acrylate copolymer of relatively high molecular weight, without using ethylene-ethyl acrylic copolymer of low molecular weight. Low molecular weight ethylene-ethyl acrylate copolymer is difficult to make due to its low viscosity in the polymerization apparatus.

The ethylene-ethyl acrylate copolymer used in the present process is prepared by well-known prior art methods such as those found in U.S. Pat. No. 3,350,372, for example, which is incorporated herein by reference. The ethylene-ethyl acrylate copolymer has a melt index of from about 0.1 to about 300, and preferably from 20 to about 300 decigrams per minute, and an ethyl acrylate content of from about 1 to about 16 and preferably from about 3 to about 11 mole percent.

The present reaction is carried out at a temperature of from about 150° C. to about 450° C., preferably from about 250° to about 400° C. and a pressure of from about 3 to about 300 kg/cm$^2$, preferably from about 20 to about 250 kg/cm$^2$. The process is carried out in the presence of an inert atmosphere, such as nitrogen, argon, etc.

The ethylene-ethyl acrylate copolymer is partially hydrolyzed to produce the ethylene-ethyl acrylate-acrylic acid terpolymer, with water and/or steam in amounts of from 0.1 to about 99, preferably from about 5 to about 80 weight percent, based on the total weight of the system.

The process of the present invention is carried out by charging a conventional reactor with ethylene, water and/or steam, purging the reactor with an inert gas, heating the reactor to a predetermined temperature and pressure for a predetermined time to obtain ethylene-ethyl acrylate-acrylic acid terpolymer.

The content of acrylic acid and the molecular weight of the ethylene-ethyl acrylate-acrylic acid terpolymer product can be controlled by adjusting the quantity of water to be added and the reaction temperature, pressure and time.

The following examples are merely illustrative and are not presented as a definition of the limits of the invention:

EXAMPLE 1

A 2-liter autoclave with a magnetic stirrer was charged with 600 grams of ethylene-ethyl acrylate copolymer (Melt Index 100 decigrams per minute, 10.5 mole percent ethyl acrylate) and 36 grams of water. After purging with nitrogen gas, the autoclave was sealed. The autoclave was heated until the contents were at a temperature of 330° C. and the pressure adjusted to 72 kg/cm$^2$. The contents were maintained at this temperature and pressure for 4 hours. The autoclave was then air cooled. The ethylene-ethyl acrylate-acrylic acid terpolymer thus formed had a melt index of 600 decigrams per minute, an ethyl acrylate content of 1.8 mole percent and an acrylic acid content of 8.7 mole percent (as determined by infrared absorption spectroscopy).

EXAMPLES 2 to 12

Example 1 was exactly repeated. The amount of ethylene-ethyl acrylate copolymer charged to the reactor, its melt index (decigrams per minute) and ethyl acrylate content (mole percent), amount of water charged to the reactor, the temperature and pressure of the reaction, the time in hours at which the reaction was run, the melt index of the ethylene-ethyl acrylate acrylic acid terpolymer produced as well as its ethyl acrylate (mole percent) and acrylic acid (mole percent) content are set forth in the Table.

TABLE

| | REACTANTS | | | | REACTION CONDITIONS | | | PRODUCT PROPERTIES | | |
|---|---|---|---|---|---|---|---|---|---|---|
| | Ethylene-Ethyl Acrylate Copolymer | | | Water | | | | Melt | Ethyl | Acrylic |
| | | Melt | Ethyl | | | | | | | |
| | | Index | Acrylate | Qty | Pressure | | | Index | Acrylate | Acid |
| Example | Qty (grams) | (dg/min) | (mole %) | (grams) | (kg/cm$^2$) | Temp (°C.) | Time (hr) | (dl/g) | (mole %) | (mole %) |
| 2 | 600 | 100 | 10.5 | 36 | 40 | 250 | 4 | 520 | 2.4 | 8.1 |
| 3 | 600 | 100 | 10.5 | 36 | 40 | 250 | 0.5 | 270 | 5.3 | 5.3 |
| 4 | 600 | 50 | 8.5 | 120 | 205 | 330 | 4 | 220 | 0.7 | 7.8 |
| 5 | 600 | 100 | 10.5 | 120 | 205 | 330 | 0.5 | 300 | 3.2 | 7.4 |
| 6 | 600 | 100 | 10.5 | 120 | 40 | 250 | 0.5 | 200 | 4.3 | 6.2 |
| 7 | 300 | 100 | 10.5 | 600 | 205 | 330 | 4 | 300 | 0.3 | 10.2 |
| 8 | 300 | 100 | 10.5 | 600 | 205 | 330 | 0.5 | 280 | 3.2 | 7.4 |
| 9 | 300 | 100 | 10.5 | 600 | 40 | 250 | 4 | 200 | 1.1 | 9.5 |
| 10 | 600 | 50 | 6.5 | 120 | 40 | 250 | 4 | 180 | 1.2 | 5.3 |
| 11 | 600 | 200 | 9.4 | 36 | 72 | 330 | 0.5 | 820 | 3.1 | 6.3 |
| 12 | 600 | 150 | 9.4 | 120 | 40 | 250 | 4 | 620 | 1.8 | 7.7 |

What is claimed is:

1. A process for preparing ethylene-ethyl acrylate-acrylic acid terpolymer having a melt index of from 50 to about 2000 decigrams per minute from ethylene-ethyl acrylate copolymer having a melt index of from 0.1 to about 300 decigrams per minute, by hydrolyzing the ethylene-ethyl acrylate copolymer in an inert atmosphere at a temperature of from about 150° C. to about 450° C. and a pressure of from about 3 to about 300 kg/cm$^2$.

2. A process as claimed in claim 1, wherein the ethylene-ethyl acrylate copolymer has a melt index of from 20 to 300 decigrams per minute.

3. A process as claimed in claim 1, wherein the ethylene-ethyl acrylate copolymer has an ethyl acrylate content of 1 to about 16 mole percent.

4. A process as claimed in claim 3, wherein the ethylene ethyl acrylate content is about 3 to about 11 mole percent.

5. A process as claimed in claim 1, wherein from 0.1 to about 99 weight percent of water is used in the hydrolysis.

6. A process as claimed in claim 5, wherein about 5 to about 80 weight percent of water is used.

7. A process as claimed in claim 5, wherein the water is in the form of steam.

8. A process as claimed in claim 1, wherein the temperature is about 250° to about 450° C.

9. A process as claimed in claim 1, wherein the pressure is about 20 to about 250 kg/cm$^2$.

* * * * *